US010592552B1

(12) United States Patent
Cooper et al.

(10) Patent No.: US 10,592,552 B1
(45) Date of Patent: *Mar. 17, 2020

(54) DETERMINING REAL-TIME TIMESTAMPS FOR ROBOTIC SENSOR DATA

(71) Applicant: X Development LLC, Mountain View, CA (US)

(72) Inventors: Emily Cooper, San Francisco, CA (US); David Deephanphongs, San Francisco, CA (US); Yuanzheng Gong, Santa Clara, CA (US); Thomas Buschmann, Mountain View, CA (US); Matthieu Guilbert, Fremont, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,836

(22) Filed: Apr. 4, 2019

Related U.S. Application Data

(63) Continuation of application No. 15/490,711, filed on Apr. 18, 2017, now Pat. No. 10,296,602.

(51) Int. Cl.
*G06F 16/58* (2019.01)
*G06F 16/51* (2019.01)
(Continued)

(52) U.S. Cl.
CPC ........ *G06F 16/5866* (2019.01); *B25J 9/1697* (2013.01); *G06F 16/51* (2019.01); *H04N 5/04* (2013.01); *H04N 5/76* (2013.01)

(58) Field of Classification Search
CPC ............ G06F 17/30268; G06F 17/3028; B25J 9/1697; H04N 5/76; H04N 5/04
See application file for complete search history.

(56) References Cited

U.S. PATENT DOCUMENTS 10,296,602 B1 * 5/2019 Cooper ................... H04N 5/76
2011/0207417 A1 8/2011 Hays

OTHER PUBLICATIONS

Li, M., et al. "Online Temporal Calibration for Camera-IMU Systems: Theory and Algorithms." The International Journal of Robotics Research 33, No. 7 (2014): 947-964. 2014.
(Continued)

*Primary Examiner* — Twyler L Haskins
*Assistant Examiner* — Angel L Garces-Rivera
(74) *Attorney, Agent, or Firm* — Middleton Reutlinger (57) ABSTRACT

Methods, apparatus, systems, and computer-readable media for assigning a real-time clock domain timestamp to sensor frames from a sensor component that operates in a non-real-time time-domain. In some implementations, a real-time component receives capture instances that each indicate capturing of a corresponding sensor data frame by the sensor component. In response to a capture output instance, the real-time component or an additional real-time component assigns a real-time timestamp to the capture output instance, where the real-time timestamp is based on the real-time clock domain. Separately, a non-real-time component receives the corresponding sensor data frames captured by the sensor component, along with corresponding metadata. For each sensor data frame, it is determined whether there is a real-time timestamp that corresponds to the data frame and, if so, the real-time timestamp is assigned to the sensor data frame.

19 Claims, 5 Drawing Sheets

(51) Int. Cl.
*B25J 9/16* (2006.01)
*H04N 5/04* (2006.01)
*H04N 5/76* (2006.01)

(56) References Cited

OTHER PUBLICATIONS

Nikolic, J., et al. "A Synchronized Visual-Inertial Sensor System with FPGA Pre-Processing for Accurate Real-Time SLAM." In Robotics and Automation (ICRA), 2014 IEEE International Conference on, pp. 431-437. IEEE, 2014. 2014.

Harrison, A., et al. "TICSync: Knowing When Things Happened." In Robotics and Automation (ICRA), 2011 IEEE International Conference on, pp. 356-363. IEEE, 2011. 2011.

Matrix Vision GMBH. "Now tell me, how do you take standards? The million dollar question concerning USB3 Vision." Jun. 2012. Germany. 4 pages. Jun. 2012.

\* cited by examiner

DETERMINING REAL-TIME TIMESTAMPS FOR ROBOTIC SENSOR DATA

BACKGROUND

Many robots employ a suite of various sensors and utilize output from the sensors in generating control commands to control the robot. For example, output from the sensors may be utilized in path planning, object detection, grasp planning, etc.—all of which influence control commands that are generated and utilized to control the robot.

SUMMARY

In many situations, it is desirable to correlate instances of sensor data from multiple sensors of a suite of sensors. For example, it may be desirable to ensure that six separate position sensor readings from six separate position sensors of a robot all correspond to substantially the same time (e.g., to ensure that the sensor readings can be considered collectively in determining a positional state of the robot at that time). Also, for example, it may be desirable to correlate an image frame, generated based on an image sensor of a robot, to position sensor readings and/or other sensor readings that correspond to the time the image frame was captured.

One or more components (e.g., processors) of a robot operate in a so-called real-time clock domain. Some sensor components of a robot may operate in the same real-time clock domain. Instances of sensor data from such sensor components can be correlated with one another based on being received at the same time and/or having the same/similar timestamps in the real-time clock domain.

However, some sensor components of a robot operate in a time-domain that is different than the real-time clock domain of the robot. For example, some vision components include one or more vision sensors and operate in a time-domain that is different than the real-time clock domain of the robot. For instance, a vision component may operate in a time-domain that is not synced with, and/or operates at a different rate than, the real-time clock domain. Moreover, in some situations, sensor data from some sensor components may be transmitted by the sensor component over a communications channel that is separate from a real-time communications channel of a robot. For example, some vision components may transmit captured image frames over a Universal Serial Bus (USB) communications channel or other non-real-time communications channel that is separate from a real-time communications channel of the robot. This may be due to various factors such as bandwidth constraints of the real-time communications channel, cost considerations, etc.

Implementations of the present disclosure are directed to various techniques for assigning a real-time clock domain timestamp to sensor data that is based on output from a sensor component that operates in a time-domain that is different than a real-time clock domain (e.g., a real-time clock domain of a robot). The assigned real-time clock domain timestamp can be utilized to correlate such sensor data to other sensor data (e.g., based on real-time timestamps of the other sensor data). The correlated sensor data can be utilized in various planning and/or other processes of the robot, such as path planning, object detection, grasp planning, etc.

In various implementations, a real-time component receives "capture output" instances that are each generated by a sensor component based on capturing of a corresponding sensor data frame by the sensor component. For example, where the sensor component is a vision component, the vision component may generate a capture output in response to exposure of an image frame based on output from one or more vision sensors of the vision component. For instance, the capture output may be generated by the vision component at the start of an exposure, at the end of the exposure, or during the exposure. The capture output may be a "logic high", "logic low", or other signal that indicates the capturing of a sensor data frame. The capture output is received by the real-time component via a connection to an output of the sensor component, such as a connection to a general-purpose input/output (I/O) of the sensor component.

In some implementations, in response to receiving a capture output instance, the real-time component assigns a real-time timestamp to the capture output instance, where the real-time timestamp is based on the real-time clock domain. In some other implementations, the real-time component transmits an indication of the capture output to an additional real-time component over a real-time network synchronized with the real time clock domain (e.g., an EtherCAT network), and the additional real-time component assigns the real-time timestamp to the capture output instance. One of the real-time components may also additionally assign a real-time frame number (or non-numerical ordinal value) to the capture output instance. For example, a given capture output instance may be assigned real-time frame number 788, the next capture output instance assigned real-time frame number 789, etc.

Separately, a non-real-time component receives the corresponding sensor data frames captured by the sensor component, along with corresponding metadata generated by the sensor component. The metadata for a sensor data frame can include a sensor component assigned timestamp and/or a sensor component assigned frame number (or other value). The sensor data frames and the metadata are received by the non-real-time component via an additional connection to an additional output of the sensor component, such as a USB connection. It is noted that a sensor data frame will typically be received by the non-real-time component temporally after its corresponding capture instance is separately received by the real-time component. This can be due to various factors, such as processing delays by the sensor component in generating the sensor data frame, latency in the communications channel between the sensor component and the processing component, etc.

The non-real-time component also receives the real-time timestamps and optional real-time frame values (generated by the real-time component(s) based on separate corresponding capture outputs). For each sensor data frame, the non-real-time component determines whether there is a real-time timestamp that corresponds to the data frame and, if so, assigns the real-time timestamp to the sensor data frame.

Various techniques can be utilized to determine that a given sensor data frame corresponds to a given real-time timestamp. For example, where real-time and sensor component generated frame values are utilized, they can be compared to ensure correspondence. The correspondence between frame values can be based on a prior synchronization as described in more detail herein. It is noted that in various implementations a "corresponding" or "matching" real-time frame value and sensor component generated frame value will not necessarily strictly correspond (i.e., both will not necessarily be the same value). As another example, real-time and sensor component generated timestamps can additionally or alternatively be compared to ensure correspondence. The correspondence between timestamps can be based on a prior synchronization as described in more detail herein—and can further be based on "expected" inter-frame times. It is noted that in various implementations a "corresponding" or "matching" real-time timestamp and sensor component generated timestamp will not necessarily strictly correspond (i.e., both will not necessarily be the same value). Additional description of implementations of these and other techniques is provided herein.

As mentioned in the preceding paragraph, in various implementations a synchronization can be performed to determine an initial correspondence between a real-time timestamp and a sensor component generated timestamp and/or to determine an initial correspondence between a real-time frame value and a sensor component generated frame value. The synchronization can occur as a result of a sync command provided to the sensor component. The sync command causes the sensor component to use at least one "out of band" frame rate in generating one or more sensor data frames (e.g., a frame rate that is 2.5 times a "normal" frame rate, or a frame rate that is 0.67 times a "normal" frame rate). The sync command can be, for example, an explicit request to adjust a frame rate, a command that causes the sensor component to perform a programmed "sync" frame rate adjustment, an alteration of a rate of capture triggers provided to the sensor component (when the sensor component is externally triggered), etc. Real-time timestamp(s) and sensor component generated timestamp(s) received following the sync command can be monitored to determine those timestamps that were generated by the out of band frame rate—thereby enabling a determination that a given real-time timestamp corresponds to a given sensor data frame. Subsequent real-time timestamps can then be correlated to subsequent sensor data frames based on such initially determined correspondence as a result of the sync command. For example, the initially determined correspondence can provide an indication of a correspondence between the given real-time timestamp and a sensor component generated timestamp of the given sensor data frame—and used to determine which future real-time timestamps correspond to which future sensor component generated timestamps (and as a result, their corresponding sensor frames). Also, for example, the initially determined correspondence can additionally or alternatively provide an indication of a correspondence between a real-time frame value that corresponds to the given real-time timestamp and a sensor component generated frame value of the given sensor data frame—and used to determine which future real-time frame values correspond to which future sensor generated frame values (and as a result, their corresponding sensor frames).

Some of the examples given above are described with respect to "internal triggering" of the capturing of sensor data frames by a sensor component. In other words, some examples are described with respect to situations where the sensor component itself triggers the capturing of sensor data frames. However, various techniques described herein are utilized in situations where capturing of a sensor data frame occurs in response to an external "capture trigger" transmitted by a real-time component to a sensor component. For example, instead of a vision sensor capturing an image frame in response to an internal trigger of the vision sensor, it may capture the image frame in response to a capture trigger provided by a real-time component. In some of those implementations, real-time timestamps and/or real-time frame values can be generated in response to transmitting the capture trigger (e.g., in lieu of being generated in response to receiving the capture output). Also, in some of those implementations, the sync command can be an adjustment, by the real-time component, of a rate of transmissions of the capture trigger. Also, in some implementations sensor components may be operable in both an internal trigger mode and an external trigger mode—and techniques described herein may be dynamically adapted dependent on the mode.

In various implementations, a sensor component may include multiple sensors. In some of those implementations, the sensor component generates multiple sensor data frames in a single capture, with each sensor data frame corresponding to a subgroup of one or more of the multiple sensors. For example, a vision component may include two opposed sensors used to generate a stereo image frame (that includes depth values) and an additional sensor used to generate an additional monocular image frame (e.g., an "RGB" image frame). Techniques described herein are adaptable to such scenarios to enable real-time timestamps to be assigned to each of multiple sensor data frames. In some implementations, the same real-time timestamp may be assigned to each of multiple sensor data frames of a given instance.

In some implementations, a method may be provided that includes receiving a capture output generated by a vision component of a robot. The vision component includes one or more vision sensors, and operates in a vision component clock domain. Receiving the capture output is by a real-time component of the robot via a connection to an output of the vision component. The real-time component operates in a real-time clock domain. The capture output is generated by the vision component based on capturing of an image frame, by the vision component, based on output of at least one of the vision sensors. The method further includes, in response to receiving the capture output, generating a real-time timestamp that corresponds to receiving the capture output and that is based on the real-time clock domain. The generating is by the real-time component or an additional real-time component operating in the real-time clock domain. The method further includes receiving, from the vision component, the image frame and corresponding metadata generated by the vision component. Receiving the image frame is by a non-real-time component via an additional connection to an additional output of the vision component. The method further includes determining that the image frame corresponds to the capture output based on the corresponding metadata for the image frame and, in response to determining that the image frame corresponds to the capture output, assigning the real-time timestamp to the image frame.

This method and other implementations of technology disclosed herein may each optionally include one or more of the following features.

In some implementations, the corresponding metadata generated by the vision component includes a vision component generated frame value. In some of those implementations, determining that the image frame corresponds to the capture output based on the corresponding metadata for the image frame includes: determining that the image frame corresponds to the capture output based on the vision component generated frame value. Some implementations of determining that the image frame corresponds to the capture output based on the vision component generated frame value include: determining that the image frame corresponds to the capture output based on comparison of the vision component generated frame value to a previous vision component generated frame value. The previous vision component generated frame value corresponds to a previous capture output that precedes the capture output (e.g., that immediately precedes the capture output). Some implementations of determining that the image frame corresponds to the capture output based on the vision component generated frame value additionally or alternatively include: generating a real-time frame value that corresponds to the capture output, and determining that the image frame corresponds to the capture output based on both the real-time frame value and the vision component generated frame value.

In some implementations, the corresponding metadata generated by the vision component comprises a vision component generated timestamp that is based on the vision component clock domain. In some of those implementations, determining that the image frame corresponds to the capture output based on the corresponding metadata for the image frame includes: determining that the image frame corresponds to the capture output based on the vision component generated timestamp. Some implementations of determining that the image frame corresponds to the capture output based on the vision component generated timestamp include: comparing the vision component generated timestamp to a previous vision component generated timestamp. The previous vision component generated timestamp corresponds to a previous capture output that precedes the capture output (e.g., that immediately precedes the capture output).

In some implementations, the method further includes, in response to receiving the capture output: transmitting, by the real-time component, an indication of the capture output over a real-time network synchronized with the real-time clock domain; and receiving, by the additional real-time component, the transmitted indication of the capture output. In some of those implementations, generating the real-time timestamp is by the additional real-time component and is based on a system tick of the real-time clock domain in which the transmitted indication of the capture output was received by the additional real-time component. In some versions of those implementations, the method further includes transmitting, by the real-time component, the real-time timestamp to the non-real-time component. In those versions, determining that the image frame corresponds to the capture output and assigning the real-time timestamp to the image frame can be by the non-real-time component.

In some implementations, generating the real-time timestamp is by the real-time component and is based on a time, in the real-time clock domain, at which the capture output is received by the real-time component.

In some implementations, the image frame is a stereo image frame, and the capture output is generated by the vision component based on capture of the image frame and an additional image frame that is a monocular image frame. In some of those implementations, the method further includes: receiving, from the vision component, the additional image frame and corresponding additional metadata generated by the vision component; determining that the additional image frame corresponds to the capture output based on the additional corresponding metadata for the additional image frame; and, in response to determining that the additional image frame corresponds to the capture output, assigning the real-time timestamp to the additional image frame. In some versions of those implementations, receiving the image frame is by the non-real-time component via the additional connection to the additional output of the vision component.

In some implementations, the additional connection is a universal serial bus connection.

In some implementations, the capture output is a voltage output that satisfies a threshold.

In some implementations, the method further includes generating control commands for one or more actuators of the robot based on the real-time timestamp assigned to the image frame.

In some implementations, a method may be provided that includes transmitting a capture trigger to a vision component of a robot. The vision component of the robot operates in a vision component clock domain. Transmitting the capture trigger is by a real-time component of the robot and causes a capture of an image frame by the vision component. The real-time time component operates in a real-time clock domain. The method further includes, in response to transmitting the capture trigger, generating a real-time timestamp that corresponds to the capture trigger and that is based on the real-time clock domain. Generating the real-time timestamp is by the real-time component or an additional real-time component operating in the real-time clock domain. The method further includes receiving, from the vision component, the image frame and corresponding metadata generated by the vision component. Receiving the image frame is via an additional connection to an additional output of the vision component. The method further includes: determining that the image frame corresponds to the capture output based on the corresponding metadata for the image frame; and, in response to determining that the image frame corresponds to the capture output, assigning the real-time timestamp to the image frame.

This method and other implementations of technology disclosed herein may each optionally include one or more of the following features.

In some implementations, the image frame and the corresponding metadata are received via a non-real-time communications channel and/or are received by a non-real-time component that does not operate in the real-time clock domain. In some versions of those implementations, the image frame and the corresponding metadata are received via the non-real-time communications channel and are received by the non-real-time component. In some of those versions, the non-real-time component determines that the image frame corresponds to the capture output and/or assigns the real-time timestamp to the image frame. In some other versions of those implementations, the image frame and the corresponding metadata are received via the non-real-time communications channel and are received by the real-time component or the additional real-time component. In some of those other versions, the real-time component or the additional real-time component determine that the image frame corresponds to the capture output and/or assign the real-time timestamp to the image frame.

In some implementations, a method may be provided that includes transmitting a sync command to a vision component of a robot. The vision component includes one or more vision sensors and operates in a vision component clock domain. The sync command causes the vision component to utilize an adjusted frame rate for an image frame generated by the vision component. The method further includes receiving a capture output generated by the vision component based on capture of the image frame by the vision component. Receiving the capture output is by a real-time component of the robot via a connection to an output of the vision component. The real-time component operates in a real-time clock domain. The method further includes, in response to receiving the capture output, generating a real-time timestamp that corresponds to receiving the capture output and that is based on the real-time clock domain. The generating is by the real-time component or an additional real-time component operating in the real-time clock domain. The method further includes determining that the capture output corresponds to the image frame with the adjusted frame rate based on comparing the real-time timestamp to a previous real-time timestamp corresponding to a previous capture output that precedes the capture output. The method further includes receiving, from the vision component, the image frame and a corresponding vision component timestamp generated by the vision component. Receiving the image frame is via an additional connection to an additional output of the vision component. The method further includes determining that the image frame corresponds to the adjusted frame rate based on comparing the vision component timestamp to a previous vision component timestamp corresponding to a previous image frame that precedes the image frame. The method further includes, in response to determining that the capture output corresponds to the image frame with the adjusted frame rate and that the image frame corresponds to the adjusted frame rate: generating, in memory, an indication that the capture output and the image frame both correspond to the same capture.

This method and other implementations of technology disclosed herein may each optionally include one or more of the following features.

In some implementations, the indication that the capture output and the image frame both correspond to the same capture includes an assignment of the real-time timestamp as a most recent real-time timestamp and an assignment of the vision component timestamp as a most recent vision component timestamp.

In some implementations, the sync command specifies the adjusted frame rate. In some of those implementations, the method further includes: transmitting an additional command to the vision component subsequent to transmitting the sync command. The additional command specifies another frame rate to be utilized during subsequent operation of the vision component.

In some implementations, the sync command causes the vision component to utilize the adjusted frame rate for the image frame, and to utilize an additional adjusted frame rate for a subsequent image frame. The subsequent image frame is generated by the vision component subsequent to the image frame.

In some implementations, a method may be provided that includes receiving a capture output generated by a sensor component that operates in a sensor component clock domain. Receiving the capture output is by a real-time component via a connection to an output of the sensor component. The real-time component operates in a real-time clock domain. The capture output is generated by the sensor component based on capturing of a sensor frame by the sensor component. The method further includes, in response to receiving the capture output, generating a real-time timestamp that corresponds to receiving the capture output and that is based on the real-time clock domain. The generating is by the real-time component or an additional real-time component operating in the real-time clock domain. The method further includes receiving, from the sensor component, the sensor frame and corresponding metadata generated by the sensor component. Receiving the sensor frame is via an additional connection to an additional output of the sensor component. The method further includes determining that the sensor frame corresponds to the capture output based on the corresponding metadata for the sensor frame and, in response to determining that the sensor frame corresponds to the capture output, assigning the real-time timestamp to the sensor frame.

This method and other implementations of technology disclosed herein may each optionally include one or more of the following features.

In some implementations, the sensor frame and the corresponding metadata are received via a non-real-time communications channel and/or are received by a non-real-time component that does not operate in the real-time clock domain. In some versions of those implementations, the sensor frame and the corresponding metadata are received via the non-real-time communications channel and are received by the non-real-time component. In some of those versions, the non-real-time component determines that the sensor frame corresponds to the capture output and/or assigns the real-time timestamp to the sensor frame. In some other versions of those implementations, the sensor frame and the corresponding metadata are received via the non-real-time communications channel and are received by the real-time component or the additional real-time component. In some of those other versions, the real-time component and/or the additional real-time component determine that the sensor frame corresponds to the capture output and/or assign the real-time timestamp to the image frame.

In some implementations, the real-time component is a real-time component of a robot and the real-time clock domain is a real-time clock domain of the robot.

In some implementations, the sensor component is a vision component.

Other implementations may include one or more non-transitory computer readable storage media storing instructions executable by one or more processors to perform a method such as one or more of the methods described above. Yet another implementation may include a robot and/or a computer system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
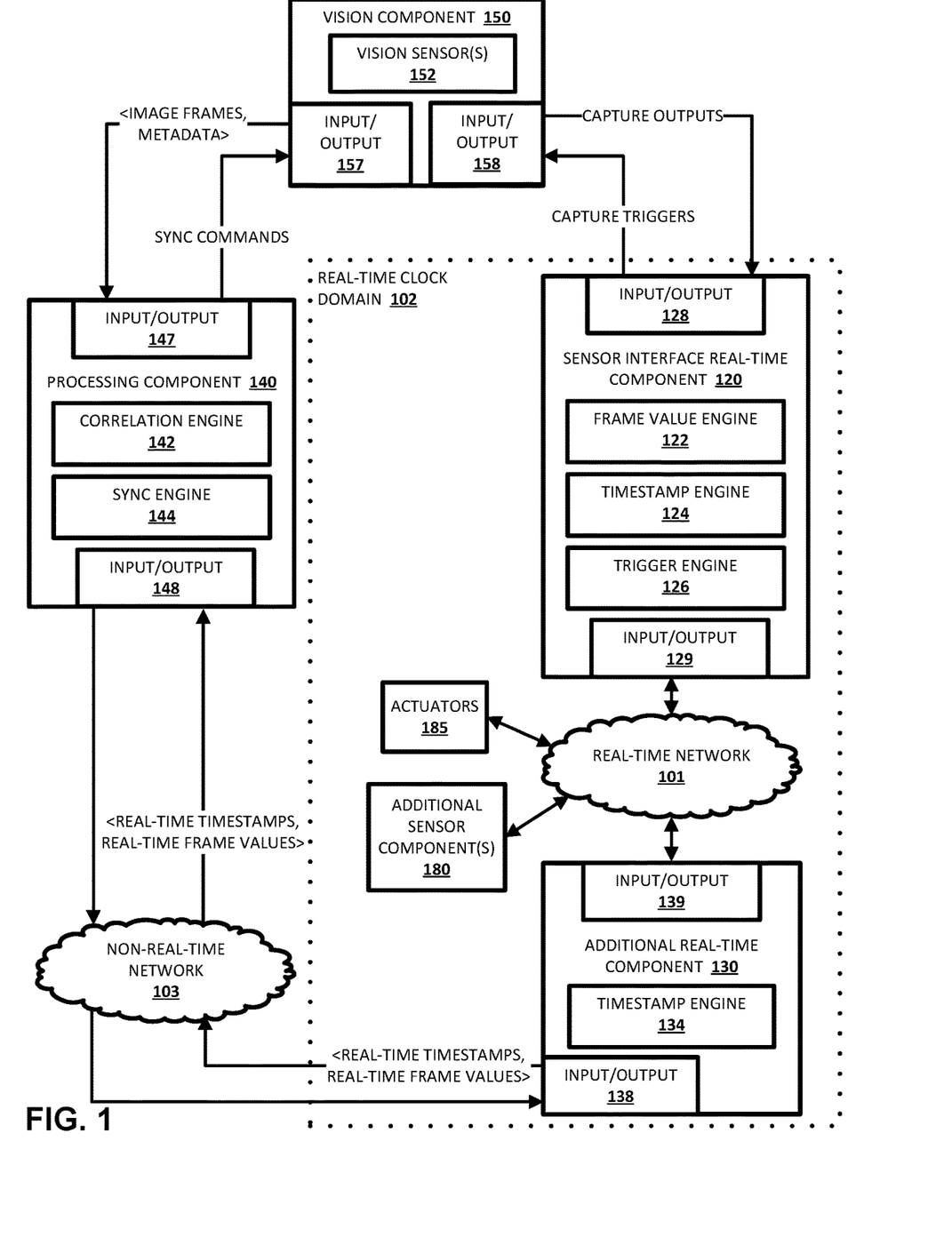
FIG. 1 illustrates an example environment in which implementations disclosed herein may be implemented.

FIG. 1 illustrates a vision component 150, a sensor interface real-time component 120, an additional real-time component 130, and a processing component 140. FIG. 1 also illustrates actuators 185, one or more additional sensor components 180, a real-time network 101, and a non-real-time network 103.

In various implementations, one or more (e.g., all) of the components 120, 130, 140, and/or 150, the actuators 185, the additional sensor components 180, and/or the networks 101 and/or 103 may be components of a robot (e.g., a "robot arm", a mobile telepresence robot, a mobile forklift robot, a humanoid robot, an unmanned aerial vehicle (UAV) robot). As one non-limiting example, the vision sensor component 150 may be coupled to and/or incorporated within a housing of the robot, with vision sensor(s) of the vision component 150 having a field of view of at least a part of the environment of the robot. As another non-limiting example, other component(s) may be incorporated within one or more housings of the robot. In some implementations, one or more components may optionally be located physically remote from a robot, but in network communication (e.g., wireless network communication) with other component(s) of the robot. For example, the processing component 140 may be implemented in a remote computing device and may be in wireless network communication with the additional real-time component 130 and the vision component 150.

FIG. 1 illustrates an example environment where the sensor component is a vision component 150 including one or more vision sensors 152. Sensor interface real-time component 120 and additional real-time component 130 both operate in real-time clock domain 102. For example, they may both be synchronized with a real-time clock and/or may both transmit and receive data over real-time network 101, which is synchronized with the real-time clock.

The vision component 150 operates in its own time-domain that is not synchronized with and/or operates at a different rate than the real-time clock domain 102. The components 120 and/or 130, which operate in the real-time clock domain 102, generate a real-time timestamp and optionally a real-time frame value in response to each instance of a capture output (provided by vision component 150 via input/output 158) or a capture trigger (provided by component 120). As described herein, each instance of a capture output or a capture trigger corresponds to an attempted generation of at least one image frame by the vision component 150 utilizing sensor output from one or more of the image sensors 152.

The additional real-time component 130 transmits the generated real-time timestamps, and optionally the real-time frame values, to a processing component 140. The processing component 140 optionally operates in yet another clock domain that is also not synced with and/or operates at a different rate than the real-time clock domain 102. The processing component 140 also receives the image frames and corresponding metadata generated by the vision component 150. The image frames and corresponding metadata are transmitted to the processing component 140 by the vision component 150 via input/output 157. Input/output 157 is separate from input/output 158 (via which capture outputs and/or capture triggers are provided). Accordingly, the image frames and corresponding metadata are transmitted over a separate communications channel than that utilized for transmission of the capture outputs and/or capture triggers.

For each received image frame, the processing component 140 determines whether there is a real-time timestamp (received from additional real-time component 130) that corresponds to the image frame and, if so, assigns the real-time timestamp to the image frame. As described herein, in some implementations the processing component 140 can determine a real-time timestamp corresponds to an image frame based on comparison of metadata of the image frame to the real-time timestamp and/or to a corresponding real-time frame value.

The processing component 140 and/or other components can utilize the real-time timestamps assigned to image frames to correlate those image frames to other sensor frames of other sensors, based on real-time timestamps also assigned to the other sensor frames. The processing component 140 can then utilize such correlations for various further processing such as path planning, object detection, grasp planning, etc. The results of such further processing can influence control commands that are generated and provided to actuators 185 and/or other components to control the robot. For example, as a result of such further processing, the processing component 140 may transmit instructions to additional real-time component 130 that cause additional real-time component 130 to provide particular control commands to actuators 185. For instance, the processing component 140 can perform path planning to generate a desired path, and provide instructions to additional real-time component 130 that causes additional real-time component 130 to provide control commands to actuators 185 to cause the robot to follow that path.

With the above overview, additional description is now provided of the various components of FIG. 1, and the interactions between the various components.

The vision component 150 of FIG. 1 is one example of a sensor component with which apparatus and/or methods described herein may interface, and/or in which aspects of apparatus and/or method described herein may be implemented. Although various examples are described herein with respect to a vision component such as vision component 150, it is understood that implementations may be utilized in combination with other sensor components that operate in a time-domain that is different from a real-time clock domain of a robot.

The vision component 150 includes one or more vision sensors 152. For example, the vision sensor(s) 152 may include two "stereo" sensors at different vantage points that are used by the vision component 150 to generate stereo image frames that include depth channel(s) (and optionally additional non-depth channel(s)). Also, for example, the vision sensor(s) 152 may additionally or alternatively include a "standalone" sensor that is used by the vision component to generate a monocular image frame (e.g., an image frame with red, green, and blue channels—but no depth channel(s) (RGB image frame)).

The vision component 150 generates image frames that are each based on sensor output from one or more of the vision sensors 152. For example, the vision component 150 can generate a stereo image frame based on corresponding sensor outputs from two stereo sensors of the vision sensors 152. For instance, the stereo image frame can be based on first sensor output generated during an exposure duration of a first stereo sensor and based on second sensor output generated during an exposure duration of a second stereo sensor. The exposure durations of the first and second stereo sensors may be the same, or may differ. The vision component 150 may perform various processing of the sensor outputs in generating the stereo image frame. Also, for example, the vision component 150 can additionally or alternatively generate a monocular image frame based on corresponding sensor output from a single sensor of the vision sensors 152. The vision component 150 may perform various processing of the sensor output in generating the monocular image frame.

The vision component 150 can generate each image frame in response to a corresponding capture trigger. A capture trigger can be an internally generated capture trigger that is generated by an internal component (e.g., a processor) of the vision component 150, or can be a capture trigger communicated to the vision component 150 by an external component (e.g., sensor interface real-time component 120). In some implementations where multiple sensor(s) 152 are provided, an exposure for each of the sensor(s) 152 is initiated by the same capture trigger (although the exposure durations of one or more of the sensor(s) may differ). In some implementations where multiple sensor(s) 152 are provided, an exposure for a first group of one or more of the vision sensor(s) 152 can be initiated by a first capture trigger, an exposure for a second group of one or more of the vision sensor(s) 152 can be initiated by a second capture trigger, etc. For example, separate stereo image and monocular image capture triggers can be utilized.

When the vision component 150 generates an image frame, it also generates metadata to assign to the image frame. The vision component 150 transmits each generated image frame and associated metadata to processing component 140. The image frame and associated metadata are transmitted from input/output 157 of the vision component 150 to input/output 147 of the processing component 140. The input/outputs 147 and 157 may be, for example, USB connections and the transmission may be over a USB cable that is coupled to the input/outputs 147 and 157. Other inputs/outputs and/or non-real-time communications channels may be utilized in the communications between vision component 150 and processing component 140.

The metadata for an image frame can include a vision component assigned image frame value for the image frame and/or a vision component assigned timestamp for the image frame.

For example, the vision component assigned image frame value can be a number. For instance, a given image frame can be assigned frame number 845, the next image frame assigned frame number 846, etc. In some implementations where the vision component 150 generates multiple types of image frames (e.g., stereo and mono), each instance of the multiple types may be generated in response to a single capture trigger and assigned the same frame number. For example, in response to a capture trigger a stereo image frame and a monocular image frame may both be generated (e.g., the start time of exposure of both may substantially correspond, although the exposure durations may differ), and the stereo image frame and the monocular image frame both assigned the same frame number. If an image frame of one type is dropped by the vision component 150 for an instance (e.g., due to noisy sensor data or other issue), while an image frame of another type is not dropped for that instance, the vision component 150 may still assign a same frame number to a subsequent instance of the two types. For example, if a stereo image frame is dropped for an instance while a monographic image frame is transmitted for the instance with a frame number of 499, a stereo image frame and a monographic image frame of a next instance can both be assigned frame number 500. In other implementations where the vision component 150 generates multiple types of image frames, different frame numbers and/or frame numbering schemes may be utilized for the different types. For example, stereo image frames may be sequentially assigned numbers 0-32,767 (then wrap), while monographic image frames may be sequentially assigned numbers 32,768-65,535 (then wrap). Additional and/or alternative frame value schemes may be utilized by the vision component 150.

The vision component assigned timestamp for an image frame is based on a time in a clock domain of the vision component 150. The time utilized for an image frame can be a time that is based on the exposure(s) utilized to generate the image frame. For example, it can be the vision component clock domain time at the beginning, end, or middle of the exposure utilized to generate the image frame. In some implementations where the vision component 150 generates multiple types of image frames (e.g., stereo and mono) in a capture instance, each of the multiple types may be assigned its own timestamp for the capture instance. For example, the timestamp for a stereo image frame of an instance can be based on a vision component clock domain time at the middle of the exposure duration for the stereo image frame, and the timestamp for a monographic image frame of the instance can be based on a vision component clock domain time at the middle of the exposure duration for the monographic image frame. It is noted that in such an example, the vision component assigned timestamps may differ due to differing exposure durations and/or differing exposure start times.

In some implementations, the vision component 150 generates a capture output based on generating an image frame using output from one or more of the vision sensors 152. For example, the vision component 150 may generate the capture output in response to an internally triggered exposure of an image frame. For instance, the capture output may be generated by the vision component 150 at the start of an exposure, at the end of the exposure, or during the exposure. A capture output may be a "logic high", "logic low", or other signal that indicates the capturing of an image frame. In implementations where the vision component 150 generates multiple types of image frames, a single capture output may be generated in response to an instance of capturing multiple types of image frames. In some other implementations, separate capture outputs may be generated (e.g., when the start of the exposures of the multiple types is asynchronous).

In implementations where capture output is generated, the capture output is transmitted from input/output 158 of the vision component 150 to input/output 128 of the sensor interface real-time component 120. The input/outputs 158 and 128 may be, for example, general purpose inputs/outputs and the transmission may be over a single conduit that is coupled to the input/outputs 158 and 128. Other inputs/outputs and/or communications channels may be utilized.

In some implementations, the vision component 150 may additionally or alternatively operate in a so-called external trigger mode, and generate an image frame in response to receiving an external capture trigger. The capture trigger can be generated by a trigger engine 126 of the sensor interface real-time component 120. The capture trigger is transmitted from input/output 128 of the sensor interface real-time component 120 to input/output 158 of the vision component 150. For example, the capture trigger can be transmitted via pins of input/outputs 128 and 158 that are separate from those used to transmit capture outputs (if any) and/or via a conduit that is separate from that used to transmit capture outputs (if any). A capture trigger may be a "logic high", "logic low", or other signal that indicates that an image frame should be captured. In implementations where the vision component 150 generates multiple types of image frames, a single capture trigger may initiate the capture of multiple types of image frames. In some other implementations, separate capture triggers may be generated (e.g., one for each type of image frame).

In response to each instance of a capture output or a capture trigger (referred to herein as a "capture instance"), the sensor interface real-time component 120 transmits, over real-time network 101, data related to that capture instance. In some implementations, the data generally indicates that a capture instance has been received or generated. In some other implementations, the data additionally or alternatively includes a real-time frame value generated by frame value engine 122 of the sensor interface real-time component 120 and/or a real-time timestamp generated by the timestamp engine 124 of the sensor interface real-time component 120.

When the frame value engine 122 generates a real-time frame value for each instance of a capture output or a capture trigger, the real-time frame value for a capture instance can be a number (or non-numerical ordinal value) for the capture instance. For example, the frame value engine 122 can increment a counter in response to receiving each capture instance, and utilize the value of the counter after incrementing as the real-time frame value for the capture instance. The counter can be wrapped on overflow. In some implementations, the real-time frame value generated by the frame value engine 122 may be generated independent of the corresponding vision component generated frame value that is separately included in the metadata for the corresponding image frame(s) provided to processing component 140. In other words, the frame value engine 122 may maintain frame values that are independent of frame values generated by vision component 150.

When the timestamp engine 124 generates a real-time timestamp for each instance of a capture output or a capture trigger, the timestamp is generated based on a time, in the real-time clock domain 102, at which the capture instance is received at the sensor interface real-time component 120. The sensor interface real-time component 120 is able to assign the timestamp in the real-time clock domain 102, as it operates in the real-time clock domain 102 (e.g., is synchronized with a real-time clock). When the sensor interface real-time component 120 assigns a real-time timestamp, it can optionally assign the real-time timestamp with "sub-tick" accuracy (i.e., at a fraction of a "system tick" in the real-time clock domain 102). As described herein, in some implementations the timestamp engine 124 is omitted, and the additional real-time component 130 assigns the real-time timestamps for capture instances.

The additional real-time component 130 receives the data related to the capture instance that is transmitted by the sensor interface real-time component 120. The data may be transmitted from an input/output 129 of the sensor interface real-time component 120, over a real-time network 101, and received at an input/output 139 of the additional real-time component 130. The input/output 129 and the input/output 139 may each be, for example, an Ethernet connector. The real-time network 101 may be, for example, a ring topology EtherCAT network or other real-time network whose transmissions are synchronized with a real-time clock.

Where the received data for the instance does not include a real-time timestamp, a real-time timestamp engine 134 of the additional real-time component 130 can generate a real-time timestamp based on a time, in the real-time clock domain 102, at which the instance was transmitted by the sensor interface real-time component 120 to the additional real-time component 130. For example, transmissions over the real-time network 101 may occur at each system tick of the real-time clock domain 102, and the timestamp engine 134 may assign a timestamp to an instance that corresponds to the system tick at which data for the instance is received by additional real-time component 130. Although this may be a less granular real-time timestamp than a real-time timestamp assigned by timestamp engine 124 (of component 120), it will still be accurate to within a system tick of the real-time clock domain 102. For example, if the system ticks of the real-time clock domain 102 occur every 4 milliseconds, the real-time timestamp will be accurate to within 4 milliseconds of the capture instance.

Where the received data for the capture instance already includes a real-time timestamp (generated by the sensor interface real-time component 120), the additional real-time component 130 may optionally not generate any additional data for the capture instance.

The additional real-time component 130 transmits the generated real-time timestamps, and optionally the real-time frame values, to the processing component 140. The additional real-time component 130 may also receive additional sensor frames from additional sensor component(s) 180, optionally assign real-time timestamps to those sensor frames (e.g., based on time of receipt by the additional real-time component 130), and provide those additional sensor frames to the processing component 140. One non-limiting example of additional sensor component(s) 180 are position sensors and/or torque sensors. The additional sensor component(s) 180 operate in the real-time clock domain 102 and may transmit corresponding sensor frames (e.g., position frames from position sensors) over the real-time network 101 at each system tick enabling the additional real-time component 130 to assign real-time timestamps to those sensor frames directly. It is noted that this is in distinction to the vision component 150, which does not operate in the real-time clock domain 102 and transmits its image frames to processing component 140 over a separate communications channel.

The processing component 140 receives the data transmitted by the additional real-time component 130. The data may be transmitted from an input/output 138 of the additional real-time component 130, over a non-real-time network 101, and received at an input/output 148 of the processing component 140. The input/output 138 and the input/output 148 may each be, for example, an Ethernet connector or a wireless connector. The non-real-time network 101 may be, for example, an Ethernet network or other non-real-time network.

The processing component 140 optionally operates in yet another clock domain that is also not synced with and/or operates at a different rate than the real-time clock domain 102. The processing component 140 also receives the image frames and corresponding metadata generated by the vision component 150. The image frames and corresponding metadata are transmitted to the processing component 140 by the vision component 150 via input/output 157. Input/output 157 is separate from input/output 158 (via which capture outputs and/or capture triggers are provided). Accordingly, the image frames and corresponding metadata are transmitted over a separate communications channel than that utilized for transmission of the capture outputs and/or capture triggers.

For each received image frame, a correlation engine 142 of the processing component 140 determines whether there is a real-time timestamp (received from additional real-time component 130) that corresponds to the image frame and, if so, assigns the real-time timestamp to the sensor data frame. As described herein, the correlation engine 142 can determine a real-time timestamp corresponds to an image frame based on comparison of metadata of the image frame to the real-time timestamp and/or to a corresponding real-time frame value.

The processing component 140 and/or other components can utilize the real-time timestamps of image frames to correlate those image frames to other sensor frames of other sensors, based on real-time timestamps also assigned to the other sensor frames. The processing component 140 can then utilize such correlations for various further processing such as path planning, object detection, grasp planning, etc. It is noted that in many implementations the further processing performed by processing component 140 is relatively computationally intensive, making it desirable to be performed on a non-real time component (since real-time performance may not be guaranteed). The results of such further processing by the processing component 140 can influence control commands that are generated and provided to actuators 185 and/or other components to control the robot. For example, as a result of such further processing, the processing component 140 may transmit instructions to additional real-time component 130 (via non-real-time network 103) that cause additional real-time component 130 to provide particular control commands to actuators 185 of the robot.

The processing component 140 also optionally includes a sync engine 144. The sync engine 144 can transmit a sync command to the vision component 150 (via input/output 147 and input/output 157). For example, the sync engine 144 can transmit the sync command after a stable stream is established between the vision component 150 and the processing component 140 (e.g., after startup and after vision component 150 has stabilized and/or a stream of image frames has been received at a nominal frame rate). The transmitted sync command causes the vision component 150 to use an "out of band" frame rate in generating one or more image frames (e.g., a frame rate that is 2.5 times a "normal" frame rate). The sync command can be, for example, an explicit request to adjust a frame rate, a command that causes the sensor component to perform a programmed "sync" frame rate adjustment, etc. The sync command can cause just a single image frame instance to be captured with the adjusted frame rate, or alternatively cause multiple image frame instances to be captured with the adjusted frame rate.

The sync engine 144 can monitor real-time timestamp(s) (received from additional real-time component 130) and sensor component generated timestamp(s) (included in metadata provided by vision component) received following the sync command to determine those timestamps that were generated by the out of band frame rate. In this manner, the sync engine 144 can determine that a given real-time timestamp corresponds to a given sensor data frame. For example, prior to the sync command, a stream of image frames may be received by the processing component 140 with vision component generated timestamps that are all approximately $1/60^{th}$ of a second apart. Also, prior to the sync command, a stream of real-time timestamps may be received by the processing component 140 that are all also approximately $1/60^{th}$ of a second apart. Prior to the sync command, the processing component 140 may be unable to ascertain which image frames correspond to which real-time timestamps. In other words, because of the different communication channels involved, the image frame processing delay of the vision component 150, and/or other considerations—the processing component 140 may not be able to confidently correlate a given image frame with a given real-time timestamp.

After the sync command, the processing component 140 may receive an image frame with a vision component generated timestamp that is approximately $1/102^{nd}$ of a second apart from a preceding vision component generated timestamp and a real-time timestamp that is also approximately $1/102^{nd}$ of a second apart from a preceding real-time timestamp (e.g., as a result of the vision component 150 adjusting, as a result of the sync command, a capture rate from 60 frames per second to 102 frames per second). The sync engine 144 can thus correlate the out of band vision component generated timestamp and the out of band real-time timestamp to one another. For example, the sync engine 144 can correlate the timestamps directly and/or correlate corresponding vision component generated frame values and/or real-time frame values. Once this initial correlation is established, the processing component 140 may be able to also correlate thereafter received image frames to real-time timestamps based on comparison of metadata of the image frames to the real-time timestamps and/or to real-time frame values. For example, if the sync engine 144 determines that vision component generated frame value 500 corresponds to real-time frame value 850, it can be assumed that vision component assigned frame value 501 corresponds to real-time frame value 851 (and the real-time timestamp for real-time frame value 851 assigned as the real-time timestamp for the image frame having the vision component generated frame value 501). Timestamp based comparisons may additionally or alternatively be utilized. For example, if the sync engine 144 determines that vision component generated timestamp 10.017 corresponds to real-time timestamp 20.067, and expected real-time and vision inter-frame times are approximately 0.017 seconds—it can be assumed that a subsequently received vision component generated timestamp of 10.034 (10.017+0.017) corresponds to a subsequently received real-time timestamp of 20.084 (20.067+0.017).

In situations where vision component 150 is externally triggered, a sync command can alternatively be generated and provided by the trigger engine 126. For example, the trigger engine 126 can initially provide capture triggers at a given rate (e.g., 60 capture triggers per second), then adjust the capture trigger rate to an "out of band" rate for one or more captures. This will likewise cause the vision component 150 to generate image frame(s) with "out of band" vision component generated timestamp(s)—and cause "out of band" real-time timestamps to be generated.

Figure 3A:
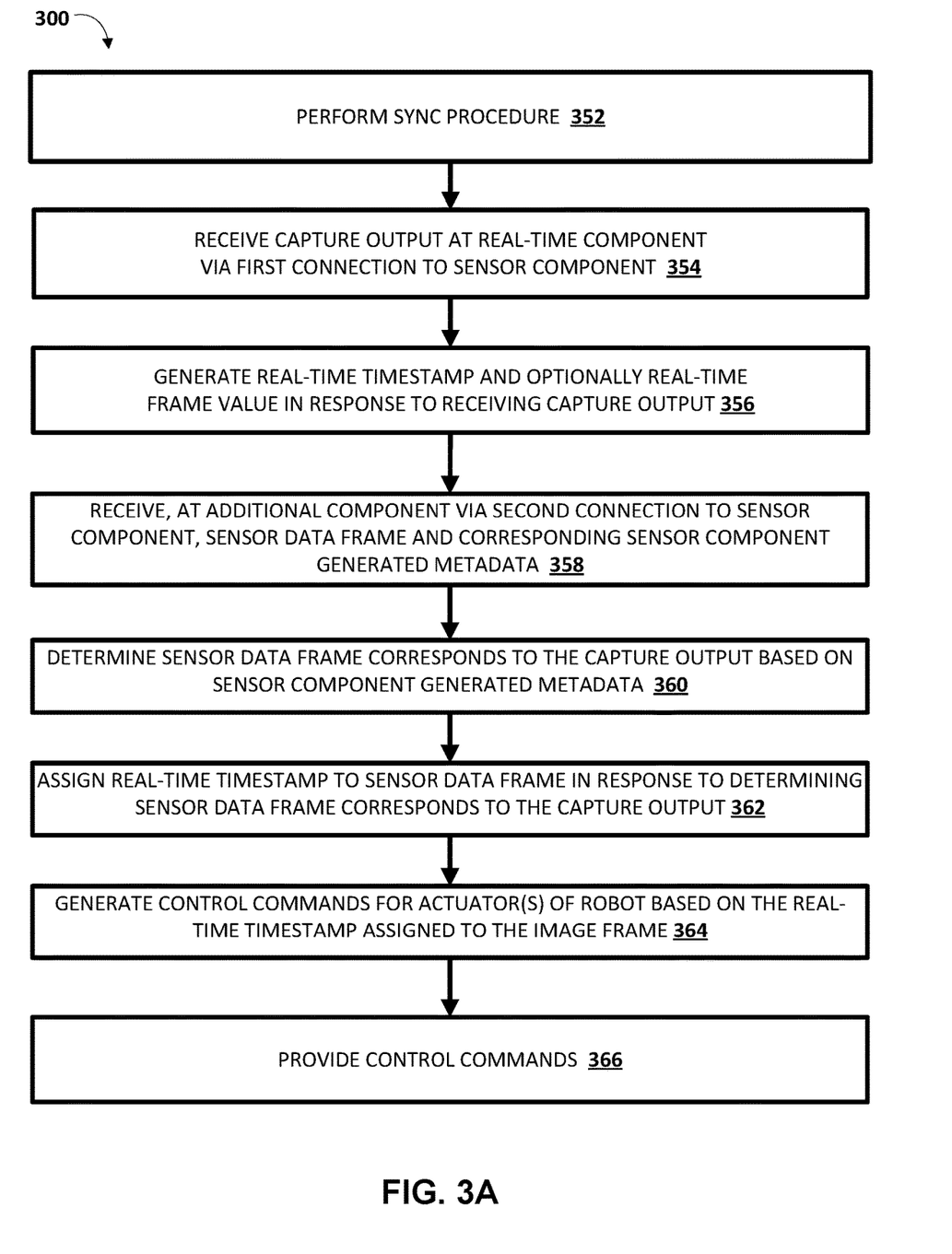
FIG. 3A illustrates an example method according to various implementations disclosed herein.
Figure 3B:
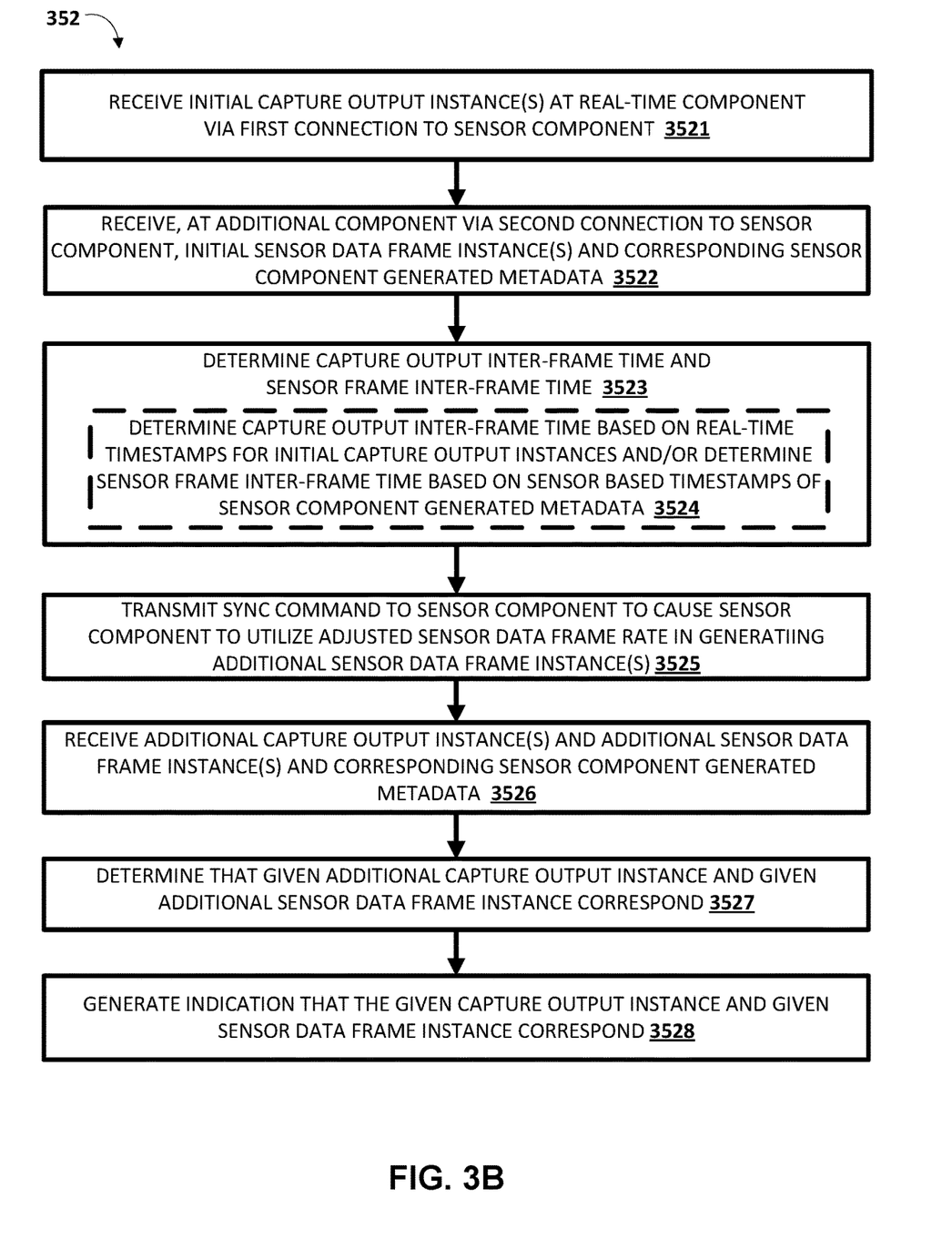
FIG. 3B illustrates an example of block 352 of the method of FIG. 3A according to various implementations disclosed herein.

Additional description of implementations of performing a synchronization are described in FIG. 3B and elsewhere herein. Further, additional description of implementations of determining that a sensor data frame corresponds to a capture output instance based on sensor component generated metadata are described in FIG. 3C and elsewhere herein.

In the example environment of FIG. 1, sensor interface real-time component 120, additional real-time component 130, processing component 140, and vision component 150 each includes one or more associated processors. For example, sensor interface real-time component 120 includes its own processor(s), additional real-time component 140 includes its own processor(s), etc. A processor can be a central processing unit (CPU), a graphics processing unit (GPU), a field-programmable gate array (FPGA), an application-specific integrated circuits (ASIC), and/or other hardware processor. The components 120, 130, 140, 150 may further each include its own memory for storing instructions (executable by its associated processor(s) to perform corresponding functions) and/or for storing various data it generates and/or receives. Memory may include, for example, random access memory (RAM) and/or a read only memory (ROM). In some implementations, each of the components 120, 130, 140, 150 may further each be independent components (e.g., share no hardware resources with one another), interacting with one another only through transmission/receipt of various data.

In some implementations, sensor interface real-time component 120 is a control board that includes at least a processor, memory, and inputs/outputs. In some of those and/or other implementations, additional real-time component 130 is a computationally more powerful component than sensor interface real-time component 120 and receives and acts upon data from sensor interface real-time component 120, data from additional sensor component(s) 180, as well as generates real-time control commands and provides those control commands to actuators 185 for controlling the robot. The additional real-time component 130 may include additional unillustrated engines such as an engine for real-time trajectory generation that is utilized to generate control commands (optionally based on higher level parameters (e.g., paths) provided by processing component 140). In some implementations, sensor interface real-time component 120 and additional real-time component 130 may optionally be combined as a single component. The processing component 140 may also be a relatively computationally powerful component (e.g., relative to component 120 and/or component 130). The processing component 140 may include additional unillustrated engines such as engine(s) for path planning, object detection, etc. Also, although various components of a robot are illustrated in FIG. 1, it is understood that additional components can be included and may optionally interface with one or more of those explicitly illustrated in FIG. 1.

Figure 2A:
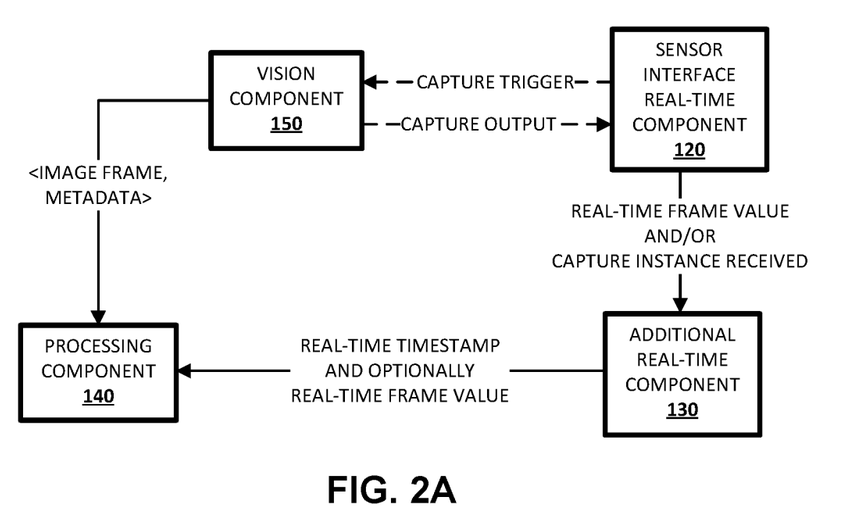
FIG. 2A illustrates various components of the example environment of FIG. 1, and an example where an additional real-time component generates a real-time timestamp.
Figure 2B:
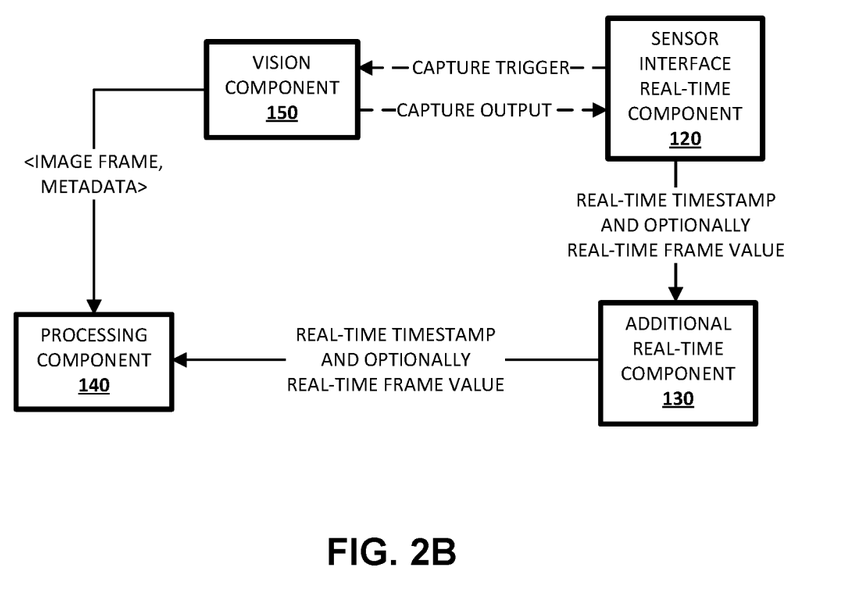
FIG. 2B illustrates the same components of FIG. 2A, and an example where a sensor interface real-time component generates a real-time timestamp.

Turning now to FIGS. 2A and 2B, each illustrates components 120, 130, 140, and 150 of FIG. 1. Both FIGS. 2A and 2B illustrate the vision component 150 providing an image frame and associated metadata to processing component 140. Further, each illustrates a capture instance being determined at sensor interface real-time component 120 as a result of either: a capture output being provided by the vision component 150 to the sensor interface real-time component 120; or a capture trigger being provided by the sensor interface real-time component 120 to the vision component 150.

In FIG. 2A, in response to the capture instance, the sensor interface real-time component 120 provides, to the additional real-time component 130, a real-time frame value and/or an indication that a capture instance was received. In response to receiving the real-time frame value and/or the indication, the real-time component 130 generates a real-time timestamp that is based on a real-time clock and corresponds to the time of transmission or receipt of the data provided by the sensor interface real-time component 120.

The additional real-time component 130 then provides the real-time timestamp, and optionally a real-time frame value, to the processing component 140. The real-time frame value may be generated by the sensor interface real-time component 120 (and received by the additional real-time component 130), or may be generated by the additional real-time component 130 directly (e.g., when the sensor interface real-time component 120 provides only an indication that a capture instance was received). The processing component 140 can determine whether the image frame received from vision component corresponds to the real-time timestamp received from additional real-time component 130 and, if so, assign the real-time timestamp to the image frame. It is noted that corresponding image frames and real-time timestamps will often be received by the processing component 140 at different times (e.g., the real-time timestamp will often be received prior to its corresponding image frame).

In FIG. 2B, in response to the capture instance, the sensor interface real-time component 120 generates the real-time timestamp and optionally the real-time frame value. The real-time timestamp generated by the sensor interface real-time component 120 is based on a real-time clock and corresponds to the time of the capture instance. In some implementations, when the sensor interface real-time component 120 generates the real-time timestamp it may do so with sub-tick accuracy (since it can be generated independent of transmission over a system tick driven real-time network). The sensor interface real-time component 120 then provides, to the additional real-time component 130, the real-time timestamp and optionally the real-time frame value. In response, the real-time component 130 then provides the real-time timestamp, and optionally the real-time frame value, to the processing component 140. The processing component 140 can determine whether the image frame received from vision component corresponds to the real-time timestamp received from additional real-time component 130 and, if so, assign the real-time timestamp to the image frame.

FIG. 3A depicts a flow chart illustrating an example method 300 in accordance with various implementations. For convenience, the operations of the flow chart are described with reference to a system that performs the operations. This system may include various components of various computer systems and/or robots, such as components 120, 130, and 140 of FIG. 1. Moreover, while operations of method 300 are shown in a particular order, this is not meant to be limiting. One or more operations may be reordered, omitted or added.

At block 352, the system performs a sync procedure. In some implementations, as a result of the sync procedure of block 352, the system determines a correspondence between a given real-time timestamp and a given sensor component generated timestamp and/or a correspondence between a given real-time frame value and a given sensor component generated frame value. For example, the system may determine that a sensor component generated timestamp of 10.017 corresponds to a real-time timestamp of 20.067. Additional description of block 352 is described below with reference to FIG. 3B.

At block 354, the system receives a capture output at a real-time component via a first connection to a sensor component. The capture output is received following the sync procedure block 352 and is received when the sensor component is operating at a "normal" frame rate (and not the out of band frame rate of the sync procedure).

At block 356, the system generates a real-time timestamp and optionally a real-time frame value in response to receiving the capture output. For example, the system can generate the real-time timestamp based on a time in a real-time clock domain and generate the real-time frame value based on sequential incrementing of a counter. In some implementations, blocks 354 and 356 are performed by one or more real-time components of the system that operate in a real-time clock domain, such as component 120 and/or component 130 of FIG. 1.

At block 358, the system receives, at an additional component via a second connection to the sensor component, a sensor data frame and corresponding sensor component generated metadata. For example, a non-real-time component of the system (e.g., processing component 140) can receive the sensor data frame and the corresponding sensor component generated metadata, directly from the sensor component.

At block 360, the system determines that the sensor data frame of block 358 corresponds to the capture output of block 354 based on the sensor component generated metadata of block 358. For example, a non-real-time component of the system can determine the correspondence based on comparing a sensor component generated timestamp of the metadata of block 358 to the real-time timestamp of the capture output. Also, for example, the non-real-time component can additionally or alternatively determine the correspondence based on comparing a sensor component generated frame value to the real-time frame value of the capture output. Additional description of block 360 is described below with reference to FIG. 3C.

At block 362, the system assigns the real-time timestamp to the sensor data frame in response to determining that the sensor data frame corresponds to the capture output. For example, the non-real-time component of the system can assign the real-time timestamp to the sensor data frame in response to such a determination.

At block 364, the system generates control command(s) for actuators of a robot based on the real-time timestamp assigned to the image frame. For example, a non-real-time component of the system can utilize the real-time timestamps assigned to the image frame (and optionally real-time timestamps assigned to other image frames and/or other sensor frames) in performing various processing such as object detection, path planning, grasp planning, etc. As a result of such further processing, the non-real-time component may transmit corresponding instructions to a real-time component of the system that cause the real-time component to generate corresponding control commands.

At block 366, the system provides the control commands to the actuators. For example, the real-time component can generate and provide the control commands to the actuators.

Multiple iterations of blocks 354, 356, 358, 360, 362, 364, and/or 366 of the method 300 may be performed following the sync procedure of block 352, each time determining that a different sensor data frame corresponds to a different real-time timestamp (or that no corresponding real-time timestamp is available—in which case the sensor data frame can optionally be "discarded").

FIG. 3B illustrates an example of block 352 of the method of FIG. 3A according to various implementations disclosed herein.

At block 3521, the system receives initial capture output instance(s) at a real-time component via a first connection to a sensor component. For example, the system can receive the initial capture output instance(s) at a real-time component of the system for a threshold time period upon initialization, until N capture output instances have been received, and/or until it is determined that the sensor component has stabilized.

At block 3522, the system receives, at an additional component via a second connection to the sensor component, initial sensor data frame instance(s) and corresponding sensor component generated metadata. For example, the system can receive the initial sensor data frame instance(s) at a non-real-time component of the system for a threshold time period upon initialization, until N capture output instances have been received, and/or until it is determined that the sensor component has stabilized.

At block 3523, the system determines a capture output inter-frame time and a sensor frame inter-frame time.

In some implementations, block 3523 includes block 3524. At block 3524, the system determines the capture output inter-frame time based on real-time timestamps for the initial capture output instances and/or determines the sensor frame inter-frame time based on sensor component generated timestamps of the sensor component generated metadata. For example, the capture output inter-frame time can be based on a mean, median, and/or other statistical measure of the differences of the real-time timestamps for multiple sequential initial capture output instances. For instance, for three initial capture output instances with real-time timestamps of 20.067, 20.084, and 20.101, the capture output inter-frame time can be the average of (20.084−20.067) and (20.101−20.084)—which is 0.17 seconds. As another example, the sensor frame inter-frame time can be based on a mean, median, and/or other statistical measure of the differences of the sensor component generated timestamps for multiple sequential sensor frames. In implementations where the sensor component generates multiple types of sensor frames, a separate sensor frame inter-frame time may be determined for each of the multiple types (e.g., a "stereo" image inter-frame time and a "mono" image inter-frame time). In some implementations, at block 3524 a single inter-frame time may be determined instead of separate capture output and sensor frame inter-frame times. For example, the single inter-frame time may be based on a statistical measure of the differences of the sequential real-time timestamps and the differences of the sensor generated timestamps.

In some other implementations of block 3523, the system determines one or more inter-frame times without reference to the initial capture output instances and/or metadata of the initial sensor data frames. For example, the system can determine a sensor frame inter-frame time based on an exposure time of the sensor component and based on a known clock rate of the sensor component. Also, for example, the system can determine a real-time inter-frame time based on an exposure time of the sensor component and based on a known clock rate of the real-time clock.

At block 3525, the system transmits a sync command to the sensor component to cause the sensor component to utilize an adjusted sensor data frame rate in generating additional sensor data frame instance(s). In some implementations, the sync command causes only a temporary (e.g., a single frame) capture rate adjustment. In some of those implementations, the system may optionally transmit another command following the sync command to cause the capture rate to be set to a "normal" capture rate following the temporary sync capture rate adjustment.

In some implementations, at block 3525 the system utilizes multiple adjusted sensor data frame rates in generating multiple additional sensor data frame instance(s). For example, the system may utilize a pre-determined sequence of sensor data frame rates. In some of those and/or other implementations, block 3523 may optionally be omitted. For instance, where one or more pre-determined sensor data frame rates are utilized, at block 3527 (described below), the system may be able to determine that additional capture output instance(s) and additional sensor data frame instance(s) correspond to one another based on them conforming to the pre-determined sensor data frame rate(s). In other words, the system can determine correspondence between additional capture output instance(s) and additional sensor data frame instance(s) based on them both conforming to the pre-determined sensor data frame rate(s) and can do so without reference to (or even determination of) expected inter-frame time(s).

At block 3526, the system receives additional capture output instance(s). At block 3526, the system also receives additional sensor data frame instance(s) and corresponding sensor component generated metadata.

At block 3527, the system determines that a given additional capture output instance and a given additional sensor data frame correspond to one another. For example, the system can monitor for additional capture output instance(s) and additional sensor data frame(s) with real-time timestamps and sensor component generated timestamps that are "out of band" (with reference to their corresponding inter-frame times) and/or that conform to a pre-determined frame rate(s) of a sync command. For example, a given additional capture output instance can be determined to be "out of band" based on comparing the real-time inter-frame time to a difference between a real-time timestamp for that given additional capture output instance and a real-time timestamp for an immediately preceding capture output instance. For instance, if the difference satisfies a threshold, that given additional capture output instance can be determined to be out of band. Likewise, a given additional sensor data frame can be determined to be "out of band" based on comparing the sensor inter-frame time to a difference between a sensor component generated timestamp for that given additional sensor data frame and a sensor component generated timestamp for an immediately preceding sensor frame.

In some implementations of block 3527, the system determines multiple out of band additional capture output instances and additional sensor data frames (e.g., 3 consecutive, 7 consecutive, 10 consecutive). In those implementations, each sequential out of band capture output instance and additional sensor data frame may be determined to correspond to one another. For example, the first out of band capture output instance and first out of band sensor data frame correspond, the second out of band capture output instance and second out of band sensor data frame correspond, etc.

At block 3528, the system generates an indication that the given instance of capture output and the given sensor data frame instance correspond to one another. For example, the indication may be that the corresponding real-time frame values and sensor generated frame values correspond and/or that the corresponding real-time timestamps and sensor generated timestamps correspond.

Figure 3C:
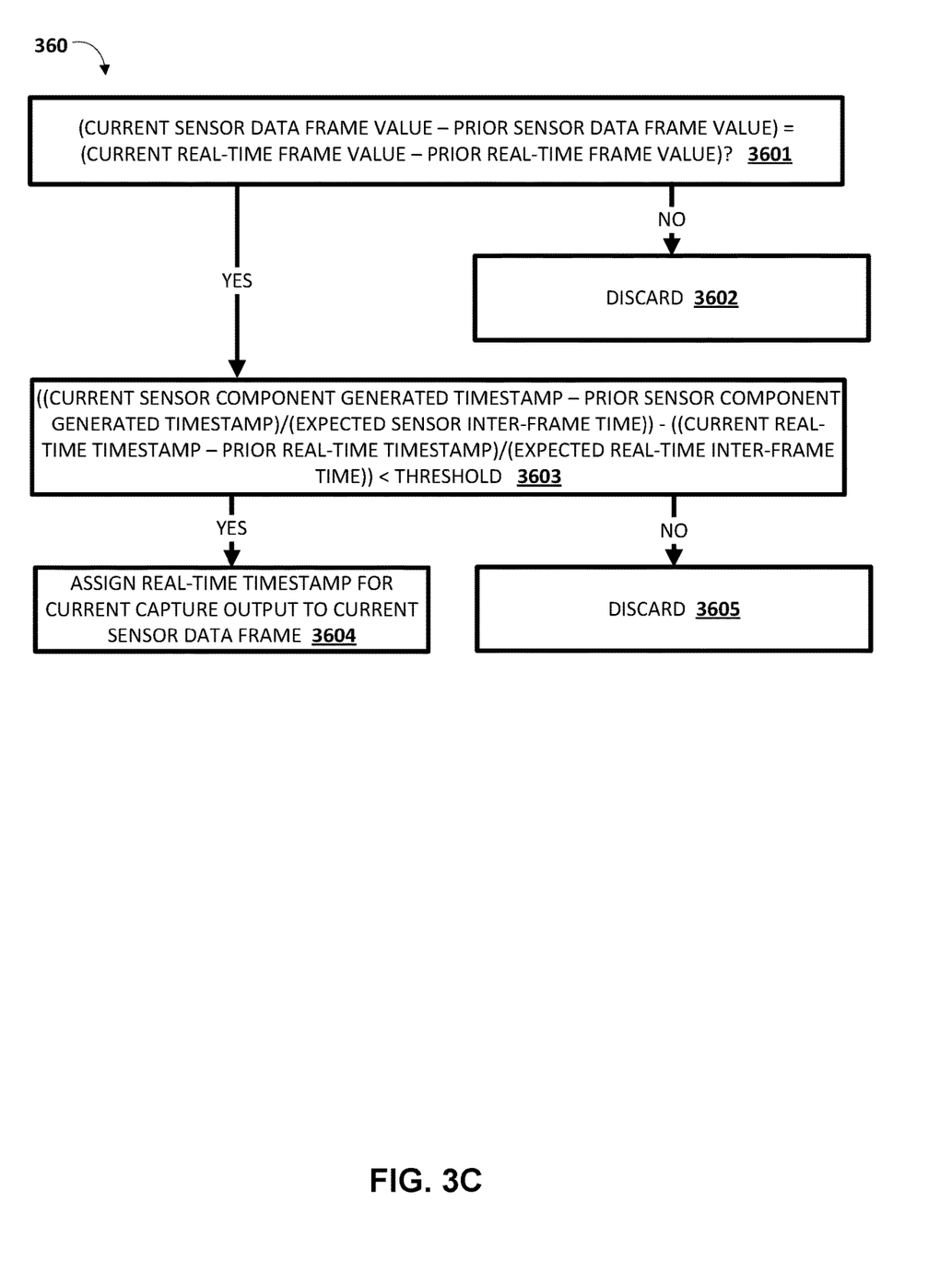
FIG. 3C illustrates an example of block 364 of the method of FIG. 3A according to various implementations disclosed herein.

FIG. 3C illustrates an example of block 360 of the method of FIG. 3A according to various implementations disclosed herein.

At block 3601, the system determines if the current sensor data frame value minus the prior sensor data frame value, is equal to the current real-time frame value minus the prior real-time frame value. If not, the system may proceed to block 3602 and discards the current sensor data frame and/or current real-time timestamp. If so, the system proceeds to block 3603.

At a first iteration of block 3601 following the sync procedure of FIG. 3B, the "current sensor data frame value" may be for the sensor data frame received immediately following the "given sensor data frame" of FIG. 3B. Also, at the first iteration, the "current real-time frame value" may be for the capture output received immediately following the "given capture output" of FIG. 3B. Accordingly, at the first iteration of block 3601 the system may effectively check to see if the current sensor data frame and the current capture output correspond—doing so with reference to the initial correspondence between real-time and sensor generated frame values determined in FIG. 3B. At a second iteration of block 3601 following the sync procedure of FIG. 3B, the "current values" of the first iteration will then be considered as "prior values" in the second iteration—and values received immediately following the "current values" of the first iteration will be considered as "current values" in the second iteration.

It is noted that "current" as utilized with reference to FIG. 3C does not necessarily refer to the "most recently received" but, rather, to the "next" item being considered. For example, the "current real-time value" may be for a "current" capture output and may be "next in a buffer", but is not necessarily the most recently received (e.g., other real-time values may have been subsequently received, but are not yet "current" in the buffer).

At block 3603, the system determines whether: ((the current sensor component generated timestamp−the prior sensor component generated timestamp)/(the expected sensor inter-frame time))−((the current real-time timestamp−the prior real-time timestamp)/(the expected real-time inter-frame time)) is less than a threshold. If not, the system may proceed to block 3602 and discard the current sensor data frame and/or current real-time timestamp. If so, the system may proceed to block 3604 and assign the real-time timestamp for the current capture output to the current sensor data frame.

At a first iteration of block 3603 following the sync procedure of FIG. 3B, the "current sensor component generated timestamp" may be for the sensor data frame received immediately following the "given sensor data frame" of FIG. 3B. Also, at the first iteration, the "current real-time timestamp" may be for the capture output received immediately following the "given capture output" of FIG. 3B. Accordingly, at the first iteration of block 3603 the system may effectively check to see if the current sensor data frame and the current capture output correspond—doing so with reference to the initial correspondence between real-time and sensor component generated timestamps determined in FIG. 3B (and the expected inter-frame times that indicate anticipated times between receipt of corresponding timestamps). At a second iteration of block 3603 following the sync procedure of FIG. 3B, the "current values" of the first iteration will then be considered as "prior values" in the second iteration—and values received immediately following the "current values" of the first iteration will be considered as "current values" in the second iteration.

Although FIG. 3C illustrates an example of performing both blocks 3601 and blocks 3603, in some implementations one of those blocks may be omitted. For example, in some of those implementations, block 3603 and 3605 may be omitted. In some versions of those implementations, in response to a "yes" determination at block 3601, the system may proceed to block 3604 and in response to a "no" determination at block 3601, the system may proceed to block 3602. In some other implementations, block 360 may include blocks 3603, 3604, and 3605—and block 3601 and 3602 may be omitted.

While some examples in FIGS. 3A, 3B, and 3C are provided with respect to instances that include a single capture output and a single sensor frame, it is understood that they may be utilized in and/or adapted to situations where multiple sensor frames are generated, and either a single corresponding capture instance is generated, or multiple corresponding capture instances are generated. For example, where a stereo image frame and a mono image frame are both generated with a corresponding capture instance, metadata from each may be compared to the real-time timestamp and/or the real-time frame value of the capture instance—and the real-time timestamp assigned to each if correspondence is determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A robot, comprising:
   a sensor component operating in a sensor component clock domain,
      wherein the sensor component generates a capture output based on capturing of a sensor frame by the sensor component, outputs the capture output over an output of the sensor component, and outputs the sensor frame over an additional output of the sensor component;
   a real-time component having a connection to the output of the sensor component,
      wherein the real-time component operates in a real-time clock domain,
      wherein the real-time component receives, via the connection to the output of the sensor component, the capture output generated by the sensor component, and
      wherein the real-time component or an additional real-time component operating in the real-time clock domain further, in response to receiving the capture output:
         generates a real-time timestamp that corresponds to receiving the capture output and that is based on the real-time clock domain;
   a non-real-time component having a connection to the additional output of the sensor component, wherein the non-real-time component:
      receives, via the additional connection to the additional output of the sensor component, the sensor frame and corresponding metadata generated by the sensor component;
   wherein one, or multiple of, the real-time component, the additional real-time component, and the non-real-time component further:
      determines that the sensor frame corresponds to the capture output based on the corresponding metadata for the sensor frame; and
      in response to determining that the sensor frame corresponds to the capture output:
         assigns the real-time timestamp to the sensor frame.

2. The robot of claim 1,
   wherein the corresponding metadata generated by the sensor component comprises a sensor component generated frame value; and
   wherein determining that the sensor frame corresponds to the capture output based on the corresponding metadata for the sensor frame comprises:
      determining that the sensor frame corresponds to the capture output based on the sensor component generated frame value.

3. The robot of claim 2, wherein determining that the sensor frame corresponds to the capture output based on the sensor component generated frame value comprises:
   determining that the sensor frame corresponds to the capture output based on comparison of the sensor component generated frame value to a previous sensor component generated frame value, the previous sensor component generated frame value corresponding to a previous capture output that precedes the capture output.

4. The robot of claim 2, wherein one, or multiple of, the real-time component, the additional real-time component, and the non-real-time component further, in response to receiving the capture output:
   generate a real-time frame value that corresponds to the capture output;
   wherein determining that the sensor frame corresponds to the capture output based on the sensor component generated frame value comprises:
   determining that the sensor frame corresponds to the capture output based on both the real-time frame value and the sensor component generated frame value.

5. The robot of claim 1,
   wherein the corresponding metadata generated by the sensor component comprises a sensor component generated timestamp that is based on the sensor component clock domain; and
   wherein determining that the sensor frame corresponds to the capture output based on the corresponding metadata for the sensor frame comprises:
      determining that the sensor frame corresponds to the capture output based on the sensor component generated timestamp.

6. The robot of claim 5, wherein determining that the sensor frame corresponds to the capture output based on the sensor component generated timestamp comprises:
   comparing the sensor component generated timestamp to a previous sensor component generated timestamp, the previous sensor component generated timestamp corresponding to a previous capture output that precedes the capture output.

7. The robot of claim 1, wherein, in response to receiving the capture output:
   the real-time component transmits an indication of the capture output over a real-time network synchronized with the real-time clock domain;
   the additional real-time component receives the transmitted indication of the capture output; and
   wherein generating the real-time timestamp is by the additional real-time component and is based on a system tick of the real-time clock domain in which the transmitted indication of the capture output was received by the additional real-time component.

8. The robot of claim 7, wherein the real-time component further transmits the real-time timestamp to the non-real-time component; and wherein determining that the sensor frame corresponds to the capture output and assigning the real-time timestamp to the sensor frame are by the non-real-time component.

9. The robot of claim 1, wherein generating the real-time timestamp is by the real-time component and is based on a time, in the real-time clock domain, at which the capture output is received by the real-time component.

10. The robot of claim 1, wherein the sensor component is a vision component.

11. The robot of claim 1, wherein the additional connection is a universal serial bus connection.

12. The robot of claim 1, wherein the capture output is a voltage output that satisfies a threshold.

13. The robot of claim 1, further comprising a processing component that generates control commands for one or more actuators of the robot based on the real-time timestamp assigned to the sensor frame.

14. A method, comprising:
  transmitting a capture trigger to a sensor component of a robot, the sensor component of the robot operating in a sensor component clock domain,
    wherein transmitting the capture trigger is by a real-time component of the robot and causes a capture of a sensor frame by the sensor component, the real-time component operating in a real-time clock domain;
  in response to transmitting the capture trigger:
  generating a real-time timestamp that corresponds to the capture trigger and that is based on the real-time clock domain,
    the generating being by the real-time component or an additional real-time component operating in the real-time clock domain;
  receiving, from the sensor component, the sensor frame and corresponding metadata generated by the sensor component,
    wherein receiving the sensor frame is via an additional connection to an additional output of the sensor component;
  determining that the sensor frame corresponds to the capture output based on the corresponding metadata for the sensor frame; and
  in response to determining that the sensor frame corresponds to the capture output:
    assigning the real-time timestamp to the sensor frame.

15. A method, comprising:
  transmitting a sync command to a sensor component of a robot, the sensor component including one or more sensors, and operating in a sensor component clock domain,
    wherein the sync command causes the sensor component to utilize an adjusted frame rate for a sensor frame generated by the sensor component;
  receiving a capture output generated by the sensor component based on capture of the sensor frame by the sensor component,
    wherein receiving the capture output is by a real-time component of the robot via a connection to an output of the sensor component, the real-time component operating in a real-time clock domain;
  in response to receiving the capture output:
    generating a real-time timestamp that corresponds to receiving the capture output and that is based on the real-time clock domain,
    the generating being by the real-time component or an additional real-time component operating in the real-time clock domain;
  determining that the capture output corresponds to the sensor frame with the adjusted frame rate based on comparing the real-time timestamp to a previous real-time timestamp corresponding to a previous capture output that precedes the capture output;
  receiving, from the sensor component, the sensor frame and a corresponding sensor component timestamp generated by the sensor component,
    wherein receiving the sensor frame is via an additional connection to an additional output of the sensor component;
  determining that the sensor frame corresponds to the adjusted frame rate based on comparing the sensor component timestamp to a previous sensor component timestamp corresponding to a previous sensor frame that precedes the sensor frame; and
  in response to determining that the capture output corresponds to the sensor frame with the adjusted frame rate and that the sensor frame corresponds to the adjusted frame rate:
    generating, in memory, an indication that the capture output and the sensor frame both correspond to the same capture.

16. The method of claim 15, wherein the indication that the capture output and the sensor frame both correspond to the same capture includes an assignment of the real-time timestamp as a most recent real-time timestamp and an assignment of the sensor component timestamp as a most recent sensor component timestamp.

17. The method of claim 15, wherein the sync command specifies the adjusted frame rate.

18. The method of claim 17, further comprising:
  transmitting an additional command to the sensor component subsequent to transmitting the sync command, wherein the additional command specifies another frame rate to be utilized during subsequent operation of the sensor component.

19. The method of claim 15, wherein the sync command causes the sensor component to utilize the adjusted frame rate for the sensor frame, and to utilize an additional adjusted frame rate for a subsequent sensor frame, the subsequent sensor frame generated by the sensor component subsequent to the sensor frame.

* * * * *